US012732875B2

(12) United States Patent
Guha et al.

(10) Patent No.: US 12,732,875 B2
(45) Date of Patent: Sep. 8, 2026

(54) METHOD AND SYSTEM FOR POWER MANAGEMENT BY A USER EQUIPMENT CONNECTED TO A NETWORK

(71) Applicant: Samsung Electronics Co., Ltd., Suwon-si (KR)

(72) Inventors: Shouvik Guha, Bangalore (IN); Shanthossh Nagarajan, Bangalore (IN); Rajendrababu Bandaru, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 18/772,896

(22) Filed: Jul. 15, 2024

(65) Prior Publication Data

US 2025/0056334 A1 Feb. 13, 2025

(30) Foreign Application Priority Data

Aug. 8, 2023 (IN) ............................ 202341053146

(51) Int. Cl.
*H04W 36/00* (2009.01)
*H04W 36/08* (2009.01)
*H04W 36/30* (2009.01)

(52) U.S. Cl.
CPC ....... *H04W 36/0058* (2018.08); *H04W 36/08* (2013.01); *H04W 36/302* (2023.05)

(58) Field of Classification Search
CPC ............. H04W 36/0058; H04W 36/08; H04W 36/302
See application file for complete search history.

(56) References Cited

U.S. PATENT DOCUMENTS 9,462,553 B2 10/2016 Gopal et al.
2015/0350973 A1 12/2015 Yang et al.
(Continued)

FOREIGN PATENT DOCUMENTS

WO 2015/183484 A1 12/2015

OTHER PUBLICATIONS

Indian Office Action dated Jul. 9, 2026, issued in Indian Application No. 202341053146.

*Primary Examiner* — Farid Seyedvosoghi
(74) *Attorney, Agent, or Firm* — Jefferson IP Law, LLP

(57) ABSTRACT

A method and a user equipment (UE) for power management by the UE connected to a network are provided. The method includes determining, by the UE, a mobility state of the UE based on satisfaction of at least one of a plurality of predefined conditions, determining, by the UE, a list of priority cells among a plurality of available cells, wherein each priority cell in the list of priority cells is associated with a priority value based on a plurality of predefined priority conditions, and switching, by the UE, the UE to a restricted mobility mode based on the determined mobility state and the priority value associated with each priority cell in the list of the priority cells, wherein switching the UE to the restricted mobility mode includes connecting the UE in one of a first sub-mode, wherein the UE refrains from transmitting a measurement report (MR) and performing cell reselection, for a predetermined time period, if the UE is in an idle state, or a second sub-mode, wherein the UE transmits the MR for a predefined number of times, if the UE is in a connected state and if the UE is configured with infinite MR configuration, wherein the infinite MR configuration corresponds to a number of MR transmitted by the UE until the UE receives a response to the MR from the network.

19 Claims, 7 Drawing Sheets

(56) References Cited

U.S. PATENT DOCUMENTS

| | | | | |
|---|---|---|---|---|
| 2015/0365859 | A1* | 12/2015 | Dalsgaard | H04W 52/0209 370/331 |
| 2018/0332532 | A1* | 11/2018 | Johansson | H04W 24/02 |
| 2024/0214849 | A1* | 6/2024 | Bergström | H04W 36/0085 |
| 2025/0113262 | A1* | 4/2025 | Tao | H04W 36/0088 |

* cited by examiner

FIG. 3
(PRIOR ART)

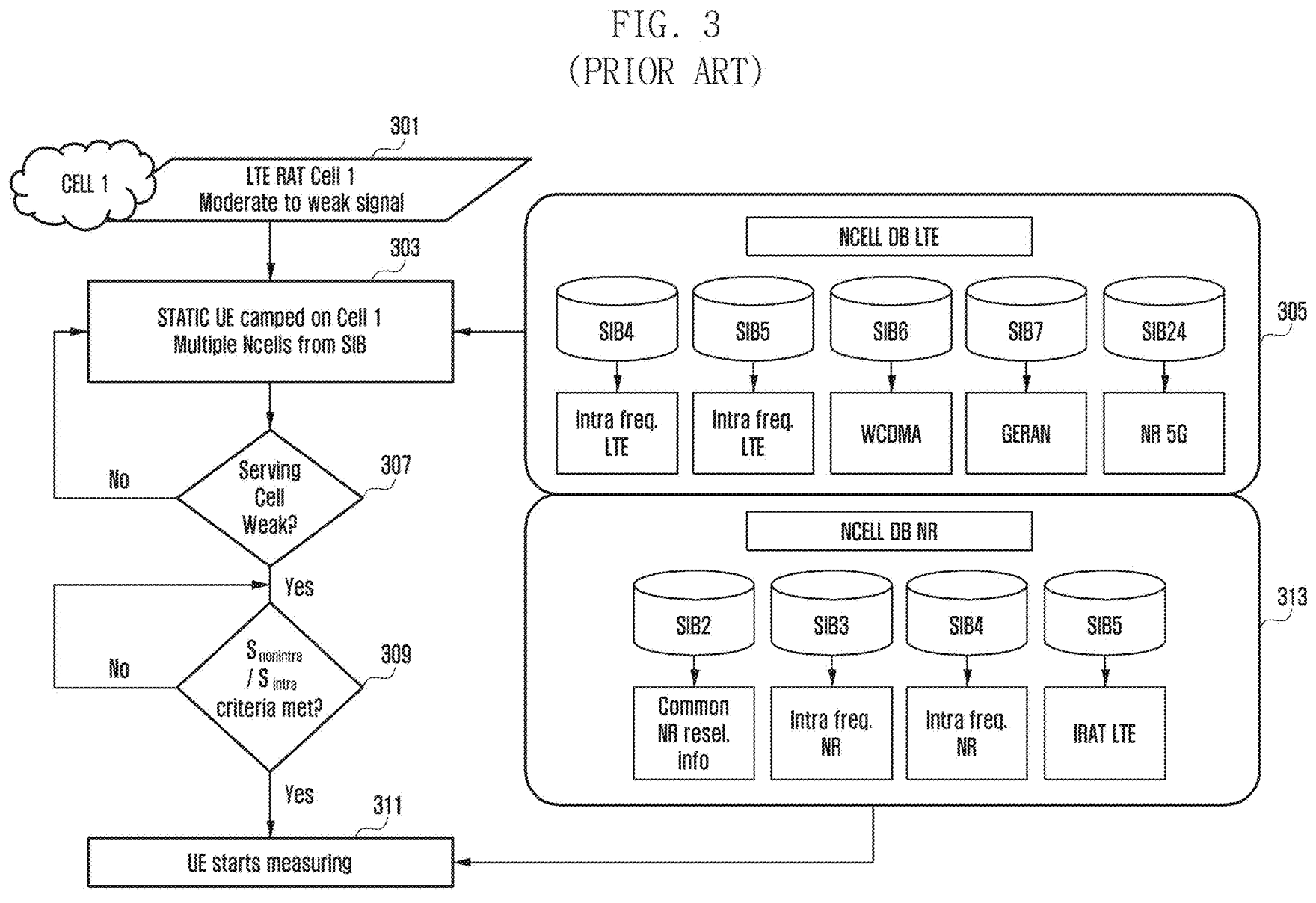

CELL 1
301
LTE RAT Cell 1
Moderate to weak signal
303
STATIC UE camped on Cell 1
Multiple Ncells from SIB
305
NCELL DB LTE
SIB4
Intra freq. LTE
SIB5
Intra freq. LTE
SIB6
WCDMA
SIB7
GERAN
SIB24
NR 5G
307
Serving Cell Weak?
No
Yes
309
$S_{nonintra}$ / $S_{intra}$ criteria met?
No
Yes
311
UE starts measuring
313
NCELL DB NR
SIB2
Common NR resel. Info
SIB3
Intra freq. NR
SIB4
Intra freq. NR
SIB5
IRAT LTE

FIG. 4

Network 410

UE 400

System 402

I/O interface 406

Processor (s) 404

Memory 408

Modem RAT status 615
GPS location 603
Home/Work Wifi connection status 601
Wearable monitor 605
UE Battery status 611
Phone in DnD 613
Mobility state determination
Clock 609
LCD / Screen Off 607
Restrict mobility?
Yes
No
STEP 503
NO ACTION

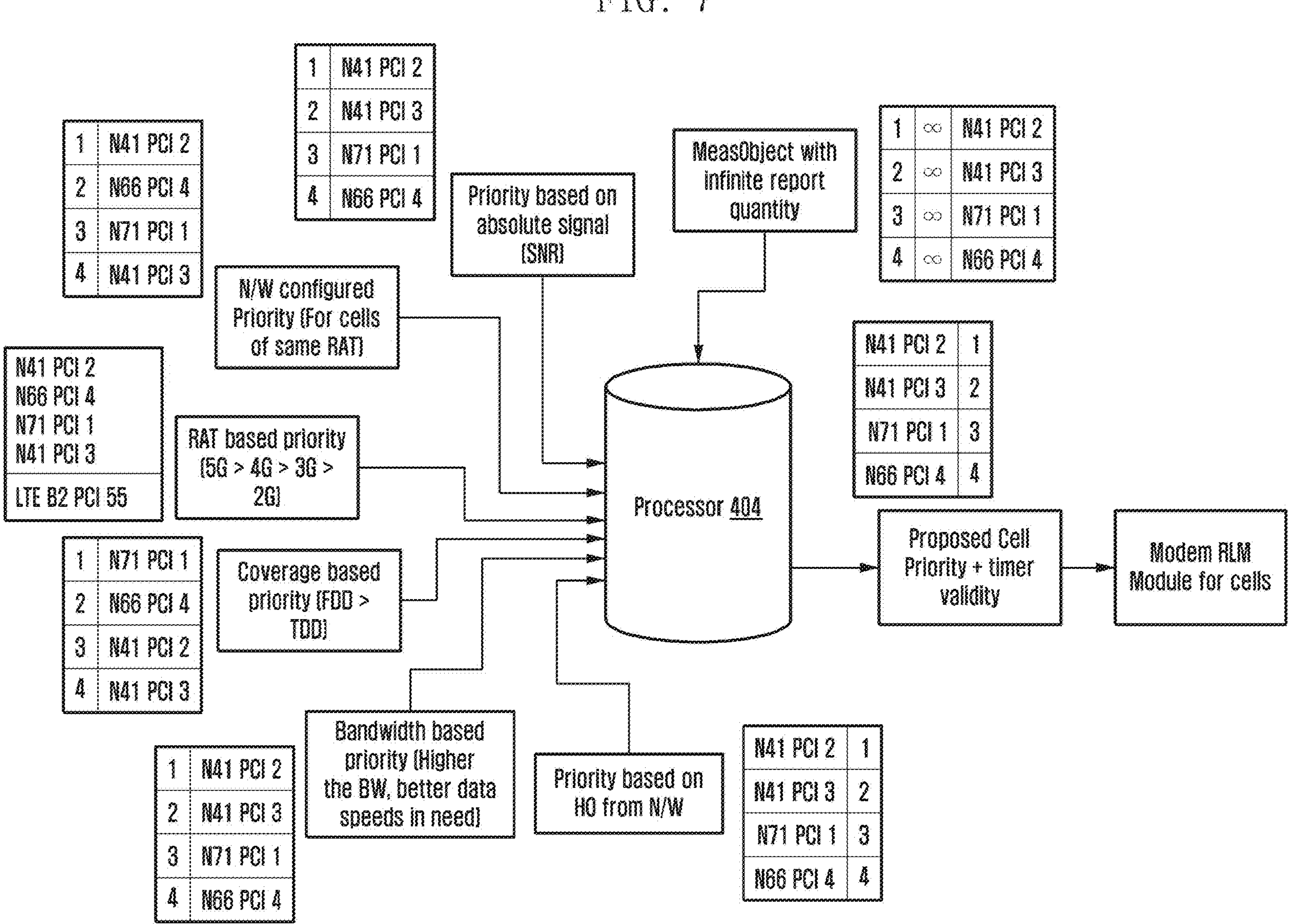
FIG. 7
MeasObject with infinite report quantity
1 ∞ N41 PCI 2
2 ∞ N41 PCI 3
3 ∞ N71 PCI 1
4 ∞ N66 PCI 4
Processor 404
N41 PCI 2 1
N41 PCI 3 2
N71 PCI 1 3
N66 PCI 4 4
Proposed Cell Priority + timer validity
Modem RLM Module for cells
Priority based on absolute signal (SNR)
1 N41 PCI 2
2 N41 PCI 3
3 N71 PCI 1
4 N66 PCI 4
N/W configured Priority (For cells of same RAT)
1 N41 PCI 2
2 N66 PCI 4
3 N71 PCI 1
4 N41 PCI 3
RAT based priority (5G > 4G > 3G > 2G)
N41 PCI 2
N66 PCI 4
N71 PCI 1
N41 PCI 3
LTE B2 PCI 55
Coverage based priority (FDD > TDD)
1 N71 PCI 1
2 N66 PCI 4
3 N41 PCI 2
4 N41 PCI 3
Bandwidth based priority (Higher the BW, better data speeds in need)
1 N41 PCI 2
2 N41 PCI 3
3 N71 PCI 1
4 N66 PCI 4
Priority based on HO from N/W
N41 PCI 2 1
N41 PCI 3 2
N71 PCI 1 3
N66 PCI 4 4

METHOD AND SYSTEM FOR POWER MANAGEMENT BY A USER EQUIPMENT CONNECTED TO A NETWORK

CROSS-REFERENCE TO RELATED APPLICATION(S)

This application is based on and claims priority under 35 U.S.C. § 119(a) of an Indian patent application number 202341053146, filed on Aug. 8, 2023, in the Indian Patent Office, the disclosure of which is incorporated by reference herein in its entirety.

BACKGROUND

1. Field

The disclosure relates to a system and a method for power management by a user equipment (UE) connected to a network.

2. Description of Related Art

The battery life of a user equipment (UE) is of growing importance for manufacturers, service providers, and users of the UE. Battery time performance is a conformance requirement of service providers and has a major effect on technical acceptance decisions. In order to maintain battery life, power consumption is a major challenge for manufacturers of the UE. One significant battery-consuming operation of the UEs is during nighttime, while the UE is in a static condition. At such times, there are multiple instances where the battery consumption of the UE is very high, even if the UE is in an idle state. At nighttime, such as between 2 AM-5 AM, the UE is usually in an IDLE state as a display of the UE is OFF, and the user is not using the UE for any kind of end-user operations. However, if the quality of the signal received from the network (N/W) is poor, then the UE performs unnecessary mobility scenarios like reselections/handovers (HO). For example, there could be many cells available in the network with similar signal and priority conditions, which causes the UE to ping pong across the cells many times, as shown in FIG. 1.

FIG. 1 illustrates idle-unnecessary inter-radio-access technology (RAT) idle reselection by UE, according to the related art.

Referring to FIG. 1, at operations 101 and 103, the UE is in IDLE state and is camped on cell 1 which belongs to a lower radio access technology (RAT), such as $2^{nd}$ generation (2G), $3^{rd}$ generation (3G), $4^{th}$ generation (4G), and long-term evolution (LTE). Cell 1 has a priority level of 4, i.e., prio4. Whereas neighbouring cell 2 belongs to a higher RAT, such as new radio (NR), and has a priority level of 6, i.e., prio6. Both these information are broadcasted via cell 1 system information. At operation 105, the UE determines if the signal received from the serving cell, i.e., cell 1 is weak. If no, then the UE is camped on cell 1. However, if the signal received from cell 1 is weak, then the UE, at operation 107, determines if the signal received from cell 2 is better than the signal received from cell 1. If yes, then the UE reselects to cell 2 (higher priority RAT, e.g., NR), at operation 109. However, after moving to cell 2, and as informed via system information on cell 2 as seen at operation 111, as cell 2 is a low-priority cell compared to cell 1, the UE executes an idle mode reselection procedure to move to a higher priority/stronger cell. Accordingly, at operation 113, the UE is camped on cell 2. Then, at operation 115, the UE determines if the signal received from the serving cell, i.e., cell 2 is weak. If no, then the UE is camped on cell 2. However, if the signal received from cell 2 is weak, then the UE, at operation 117, determines if the signal received from cell 1 is better than the signal received from cell 2. If yes, then the UE reselects to cell 1, at operation 119. This reselection procedure results in ping pong across cells 1 and 2. Further, this reselection procedure involves scanning the other RATs. Also, after moving across the RATs, the UE provides mobility update-related signaling on the new RAT as well, which in turn causes battery consumption. For example, the UE has a current consumption of 451 mili-ampere (mA) over 3 hours (hrs) [~115 mA/hr]. The usual value of the current consumption is ~35-45 mA. The entire process as illustrated in FIG. 1 is also known as idle-unnecessary inter-RAT idle reselection.

FIG. 2 illustrates unnecessary intra/inter-RAT handover and unnecessary measurement reporting in the UE, according to the related art.

Referring to FIG. 2, at operation 201, the UE is connected to a network and is camped on NR RAT cell 1 which has a moderate to weak signal quality. At operation 203, the network adds measObj of Cell 2, i.e., the network instructs the UE to perform measurement of cell 2. At operation 205, the UE determines if the signal received from the serving cell, i.e., cell 1 is weak. If no, then the UE is camped on cell 1. However, if the signal received from cell 1 is weak, then, at operation 207, the UE determines if a measurement report (MR) of cell 2 satisfies a predetermined criterion set by the network. If no, then the UE moves back to operation 205. If yes, then the UE provides the MR of cell 2 to the network, at operation 209. Accordingly, at operation 211, the network performs HO to cell 2. At operation 213, cell 2 also has moderate to weak signal quality. At operation 215, the network adds measObj of cell 1, i.e., the network instructs the UE to perform measurement of cell 1. At operation 217, the UE determines if the signal received from the serving cell, i.e., cell 2 is weak. If no, then the UE is camped on cell 2. However, if the signal received from cell 2 is weak, then, at operation 219, the UE determines if an MR of cell 1 satisfies a predetermined criterion set by the network. If no, then the UE moves back to operation 217. If yes, then the UE provides the MR of cell 1 to the network, at operation 221. Accordingly, at operation 223, the network performs HO to cell 1. The entire handover procedure results in ping pong across cells 1 and 2 and results in a lot of battery consumption. Further, in FIG. 2, even though the HO has been shown between cells of the same RAT, i.e., NR. A similar HO process occurs between cells of different RAT, such as between cells of LTE and NR. Also, during the MR process, the network configures a number of MR to be sent to the network, when the predetermined criterion is met. The IE "reportAmount" is used for this purpose. In some scenarios, the network configures the above IE with the value "infinite". That means, the UE sends an infinite amount of MRs till the network responds to the MR, either by HO or by release with redirection, etc. The infinite MR amount consumes the battery and heats the UE, especially in weak signal conditions, sometimes, as the uplink transmission might not reach the network as well.

FIG. 3 illustrates unnecessary inter/intra band neighbour monitoring by the UE, according to the related art.

Referring to FIG. 3, at operation 301, the UE is connected to cell 1 belonging to LTE RAT in IDLE mode. At operation 303, the UE is statically camped on cell 1, i.e., the UE is not moving. Also, the UE retrieves information related to multiple neighboring cells (Ncells) from different system information blocks (SIB) stored in a Ncell database (DB) LTE 305. Thereafter, at operation 307, the UE determines if the signal received from the serving cell, i.e., cell 1 is weak. If no, then the UE is camped on cell 1. However, if the signal received from cell 1 is weak, then, at operation 309, the UE determines if $S_{nonintra}/S_{intra}$ criterion (which is related to cell selection parameters in idle mode) satisfies a predetermined criterion set by the network. If no, then the UE moves back to operation 307. If yes, then, at operation 311, the UE monitors neighbour cells by performing measurements based on information retrieved from a Ncell database (DB) NR 313. Hence, the UE is in a weak signal area and intra and non-intra search is ongoing as per idle mode procedure. Accordingly, the UE is continuously scanning for a better neighbour, which results in high power consumption, for example, 186 mA over 3 hours.

This leads to unnecessary high power consumption in the UE and leads to poor battery/power performance and provides a bad user experience.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and system for power management by a user equipment connected to a network.

Additional aspects will be set forth in part in the description which follows and, in part, will be apparent from the description, or may be learned by practice of the presented embodiments.

In accordance with an aspect of the disclosure, a method for power management performed by a user equipment (UE) connected to a network is provided. The method includes determining, by the UE, a mobility state of the UE based on satisfaction of at least one of a plurality of predefined conditions, determining, by the UE, a list of priority cells among a plurality of available cells, wherein each priority cell in the list of priority cells is associated with a priority value based on a plurality of predefined priority conditions, switching, by the UE, the UE to a restricted mobility mode based on the determined mobility state and the priority value associated with each priority cell in the list of the priority cells, wherein switching the UE to the restricted mobility mode includes connecting the UE in one of a first sub-mode, wherein the UE refrains from transmitting a measurement report (MR) and performing cell reselection, for a predetermined time period, if the UE is in an idle state, or a second sub-mode, wherein the UE transmits the MR for a predefined number of times, if the UE is in a connected state and if the UE is configured with infinite MR configuration, wherein the infinite MR configuration corresponds to a number of MR transmitted by the UE until the UE receives a response to the MR from the network.

In accordance with another aspect of the disclosure, a user equipment (UE) connected to a network is provided. The UE includes memory storing one or more computer programs, and one or more processors communicatively coupled to the memory, wherein the one or more computer programs include computer-executable instructions that, when executed by the one or more processors individually or collectively, cause the UE to determine a mobility state of the UE based on satisfaction of at least one of a plurality of predefined conditions, determine a list of priority cells among a plurality of available cells, wherein each priority cell in the list of priority cells is associated with a priority value based on a plurality of predefined priority conditions, switch the UE to a restricted mobility mode based on the determined mobility state and the priority value associated with each priority cell in the list of the priority cells, wherein the UE is configured to switch to the restricted mobility mode by connecting the UE in one of a first sub-mode, wherein the UE refrains from transmitting a measurement report (MR) and performing cell reselection, for a predetermined time period, if the UE is in an idle state, or a second sub-mode, wherein the UE transmits the MR for a predefined number of times, if the UE is in a connected state and if the UE is configured with infinite MR configuration, wherein the infinite MR configuration corresponds to a number of MR transmitted by the UE until the UE receives a response to the MR from the network.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of the certain embodiments of the disclosure will be more apparent from the following description taken in conjunction with the accompanying drawings, in which:

FIG. 3 illustrates unnecessary inter/intra-band neighbor monitoring by the UE, according to the related art;

FIG. 4 illustrates a block diagram of a system for power management by the UE connected to a network, according to an embodiment of the disclosure;

FIG. 7 illustrates a plurality of predefined priority conditions to determine a list of priority cells, according to an embodiment of the disclosure.

The same reference numerals are used to represent the same elements throughout the drawings.

DETAILED DESCRIPTION

Figure 1:
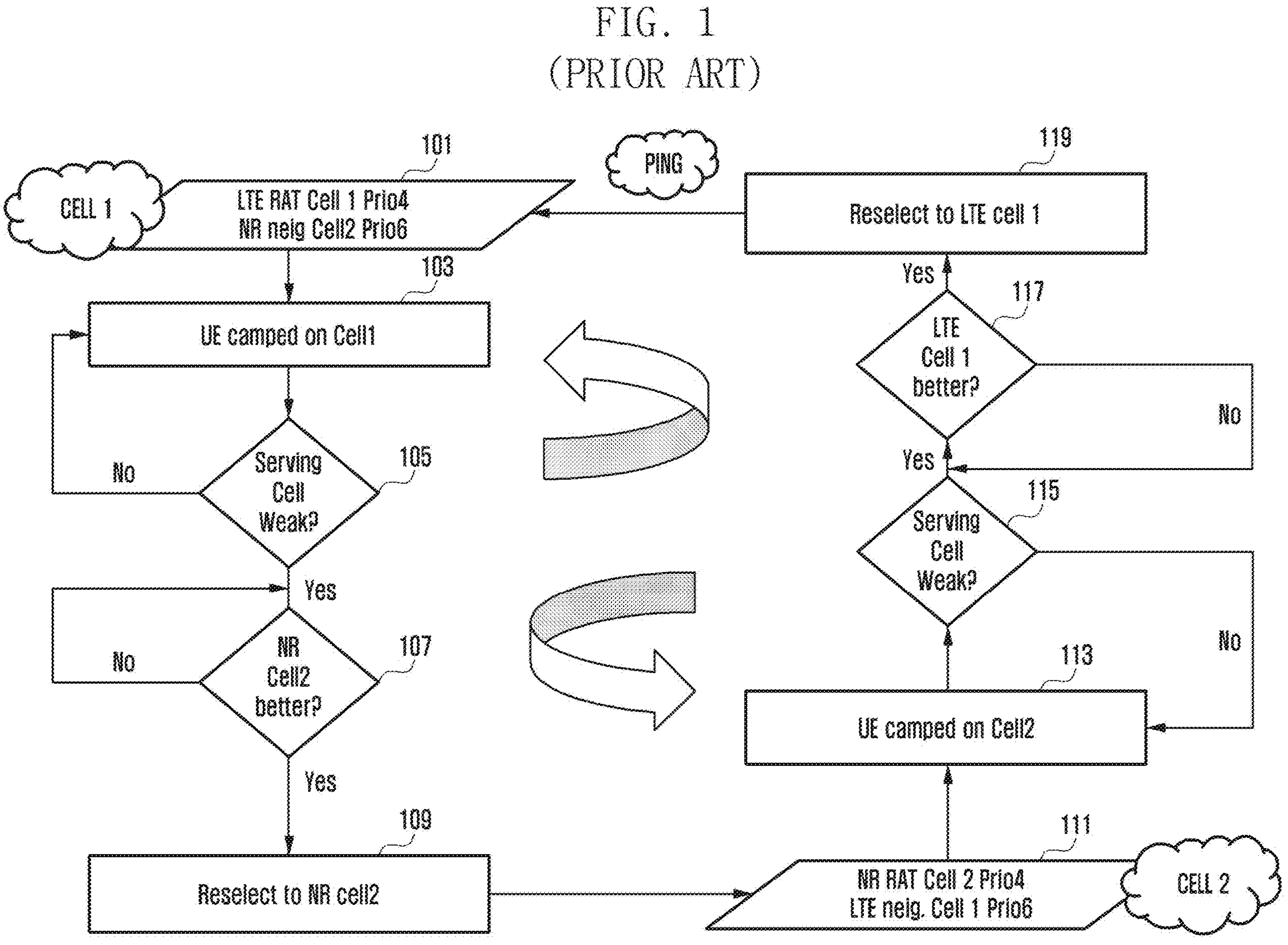
FIG. 1 illustrates idle-unnecessary inter-radio-access technology (RAT) idle reselection by UE, according to the related art.
Figure 2:
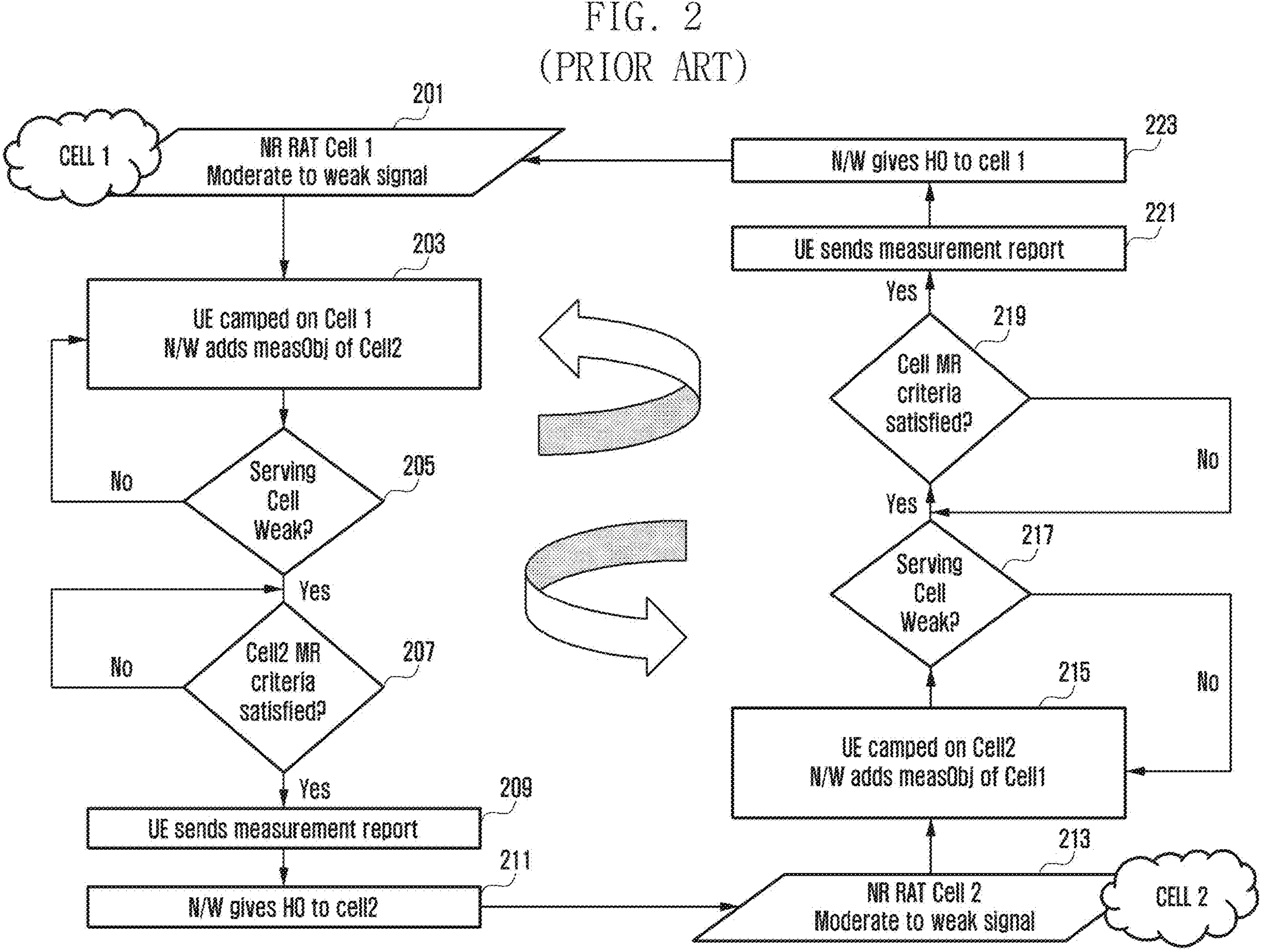
FIG. 2 illustrates unnecessary intra/inter-RAT handover and unnecessary measurement reporting by the UE, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more systems or sub-systems or elements or structures or components proceeded by "comprises . . . a" does not, without more constraints, preclude the existence of other systems or other sub-systems or other elements or other structures or other components or additional systems or additional sub-systems or additional elements or additional structures or additional components.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks that carry out a described function or functions. These blocks, which may be referred to herein as units or modules or the like, are physically implemented by analog or digital circuits, such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports, such as printed circuit boards and the like. The circuits constituting a block may be implemented by dedicated hardware, by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Referring now to the drawings, and more particularly to FIGS. 4 to 7, where similar reference characters denote corresponding features consistently throughout the figures, there are shown preferred embodiments.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 4:
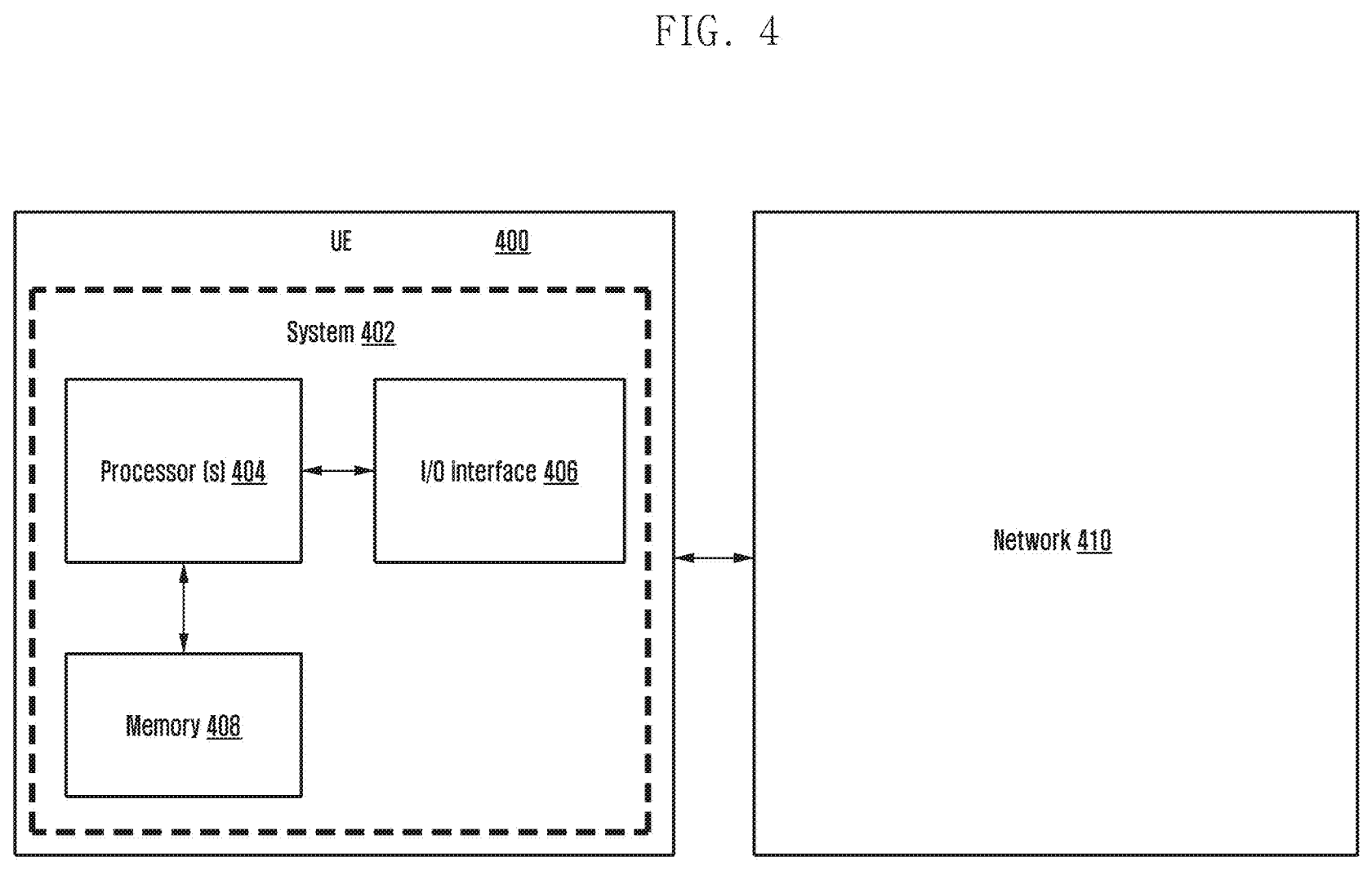

FIG. 4 illustrates a block diagram of a system 402 for power management by a user equipment (UE) connected to a network, according to an embodiment of the disclosure.

Figure 5:
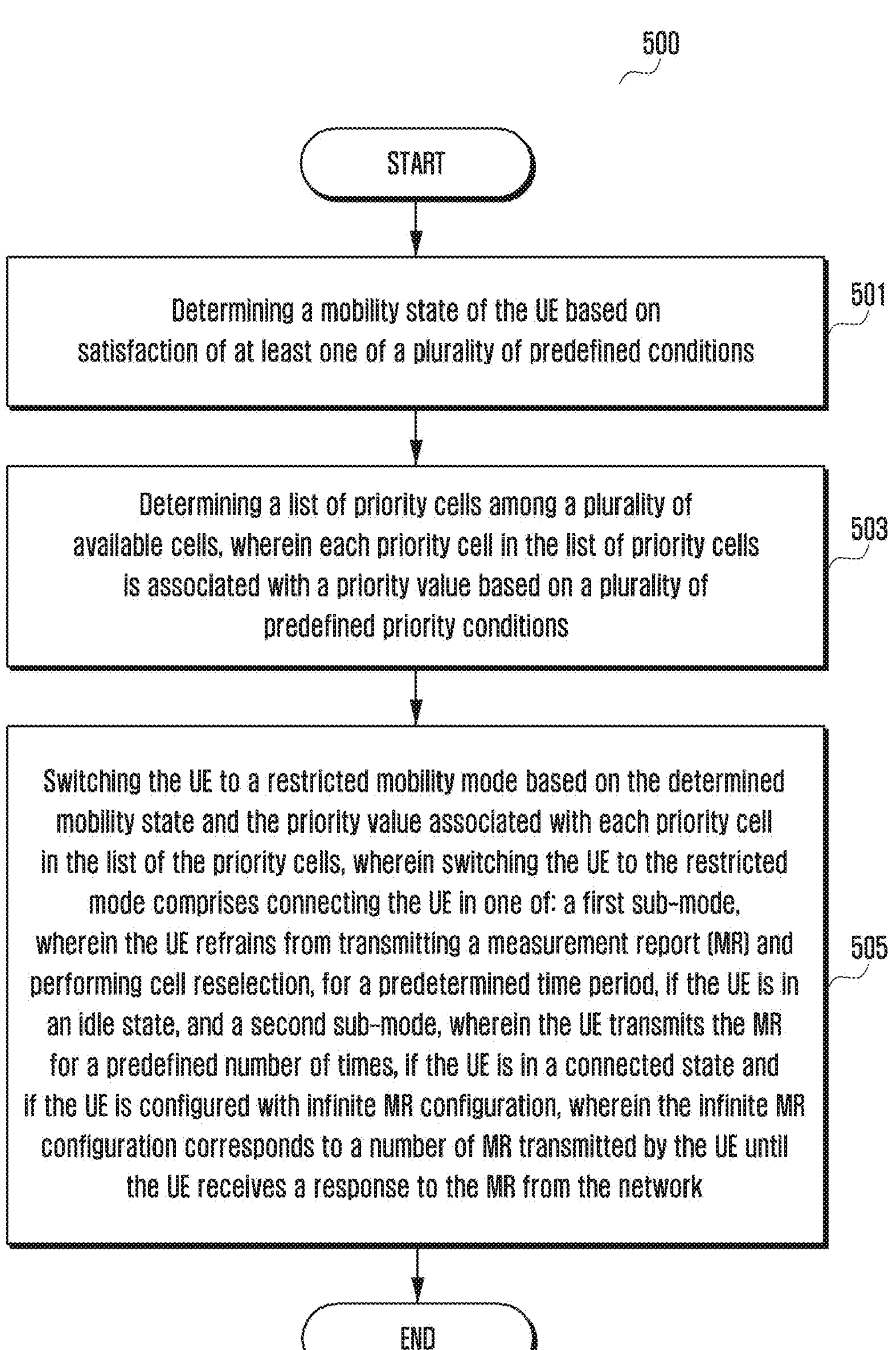
FIG. 5 illustrates a flow diagram depicting a method for power management by the UE connected to a network, according to an embodiment of the disclosure.

FIG. 5 illustrates a flow diagram of a method 500 for power management by the UE connected to the network, according to an embodiment of the disclosure.

For the sake of brevity, FIGS. 4 and 5 are explained in conjunction with each other.

Referring to FIG. 4, the system 402 may include one or more processors 404, an Input/Output (I/O) interface 406 (e.g., a communicator or communication interface, or a transceiver), and memory 408 (e.g., storage). In an embodiment, the I/O interface 406 may perform functions for transmitting and receiving signals via a wireless channel.

As an example, the one or more processors 404 may be a single processing unit or a number of units, all of which could include multiple computing units. The one or more processors 404 may be implemented as one or more microprocessors, microcomputers, microcontrollers, digital signal processors, central processing units, state machines, logic circuitries, and/or any devices that manipulate signals based on operational instructions. Among other capabilities, the one or more processors 404 are configured to fetch and execute computer-readable instructions and data stored in the memory. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an artificial intelligence (AI)-dedicated processor such as a neural processing unit (NPU). The one or more processors 404 may control the processing of the input data in accordance with a predefined operating rule or AI model stored in the non-volatile memory and the volatile memory, i.e., memory 408. The predefined operating rule or artificial intelligence model is provided through training or learning. In an embodiment, the processor 404 may perform one or more functions/methods, as discussed throughout the disclosure.

The memory 408 may include any non-transitory computer-readable medium known in the art including, for example, volatile memory, such as static Random-Access memory (SRAM) and dynamic random access memory (DRAM), and/or non-volatile memory, such as read-only memory (ROM), erasable programmable ROM, flash memories, hard disks, optical disks, and magnetic tapes. In an embodiment, the memory 408 may store the received frequency resource configuration such as different bandwidth part (BWP) configurations and crest factor reduction (CFR) configurations. Accordingly, the processor 404 may access the memory to retrieve the various data related to power management by the UE, such as mobility data of the UE, list of priority cells, etc.

Some example embodiments disclosed herein may be implemented using processing circuitry. Further, some example embodiments disclosed herein may be implemented using at least one software program running on at least one hardware device and performing management functions to control the elements.

In an embodiment of the disclosure, the one or more processors 404 include a communication processor (CP) and an application processor (AP). For example, the CP may include a modem. The CP is configured to handle layer 2 and other protocols. In an embodiment of the disclosure, the AP is associated with upper layers, such as a network layer, a transport layer, and an application layer.

Further, the one or more processors 404 may be disposed in communication with one or more I/O devices via the I/O interface 406. The I/O interface 406 may employ communication code-division multiple access (CDMA), high-speed packet access (HSPA+), global system for mobile communications (GSM), long-term evolution (LTE), worldwide interoperability for microwave access (WiMax), 5$^{th}$ generation (5G) New Radio (NR) or the like, etc.

Using the I/O interface 406, the system 402 may communicate with one or more other I/O devices, such as other UEs. For example, the input device may be an antenna, microphone, touch screen, touchpad, storage device, transceiver, video device/source, etc. The output devices may be a printer, fax machine, video display (e.g., cathode ray tube (CRT), liquid crystal display (LCD), light-emitting diode (LED), plasma, Plasma Display Panel (PDP), Organic light-emitting diode display (OLED) or the like), audio speaker, etc.

The one or more processors 404 may be disposed in communication with a communication network 410 via a network interface. In an embodiment, the network interface may be the I/O interface 406. The network interface may connect to the communication network 410 to enable connection of the system 402 with the outside environment. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 410 may include, without limitation, a direct interconnection, local area network (LAN), wide area network (WAN), wireless network (e.g., using Wireless Application Protocol), the Internet, a wireless network, and the like.

In an embodiment of the disclosure, the system 402 is communicatively coupled to a network 410 for receiving information related to cells associated with the network 410, as shown in FIG. 4. In an embodiment, the network 410 may be one of a plurality of cellular networks (such as a 3G, 4G, a 5G or pre-5G, 6$^{th}$ generation (6G) network or any future wireless communication network).

In an embodiment, the configuration of the system 402 may be understood as a part of the configuration of the UE 400. In an embodiment of the disclosure, the UE 400 may correspond to a smartphone, a laptop computer, a desktop computer, a wearable device, and the like. It should be noted that the various embodiments have been defined as the system 402 being a part of the UE 400. Accordingly, the various embodiments have been defined as being performed by the UE 400. However, in an alternate embodiment, the system 402 may be connected to the UE 400. Further, the terms "network" and "N/W" have been used interchangeably throughout the description and drawings.

Referring to FIG. 5, in an embodiment, the method 500 as defined in reference to FIG. 5 may be performed by the UE 400. As shown in FIG. 5, at operation 501, the method 500 includes determining a mobility state of the UE 400 based on satisfaction of at least one of a plurality of predefined conditions. In an embodiment, the plurality of predefined conditions is related to the interaction of the UE 400 with a user and one or more external devices. For example, one of the plurality of predefined conditions is if the user has not used the UE 400 for a long period of time, especially at night, such as between 1 AM-5 AM. If yes, then it is determined that the mobility state of the UE 400 is static. In another example, another one of the plurality of predefined conditions is if the UE 400 has been connected to office Wi-Fi during office hours such as between 10 AM-5 AM. If yes, then it is determined that the mobility state of the UE 400 is static. In another embodiment, the plurality of predefined conditions have been illustrated in FIG. 6.

Figure 6:
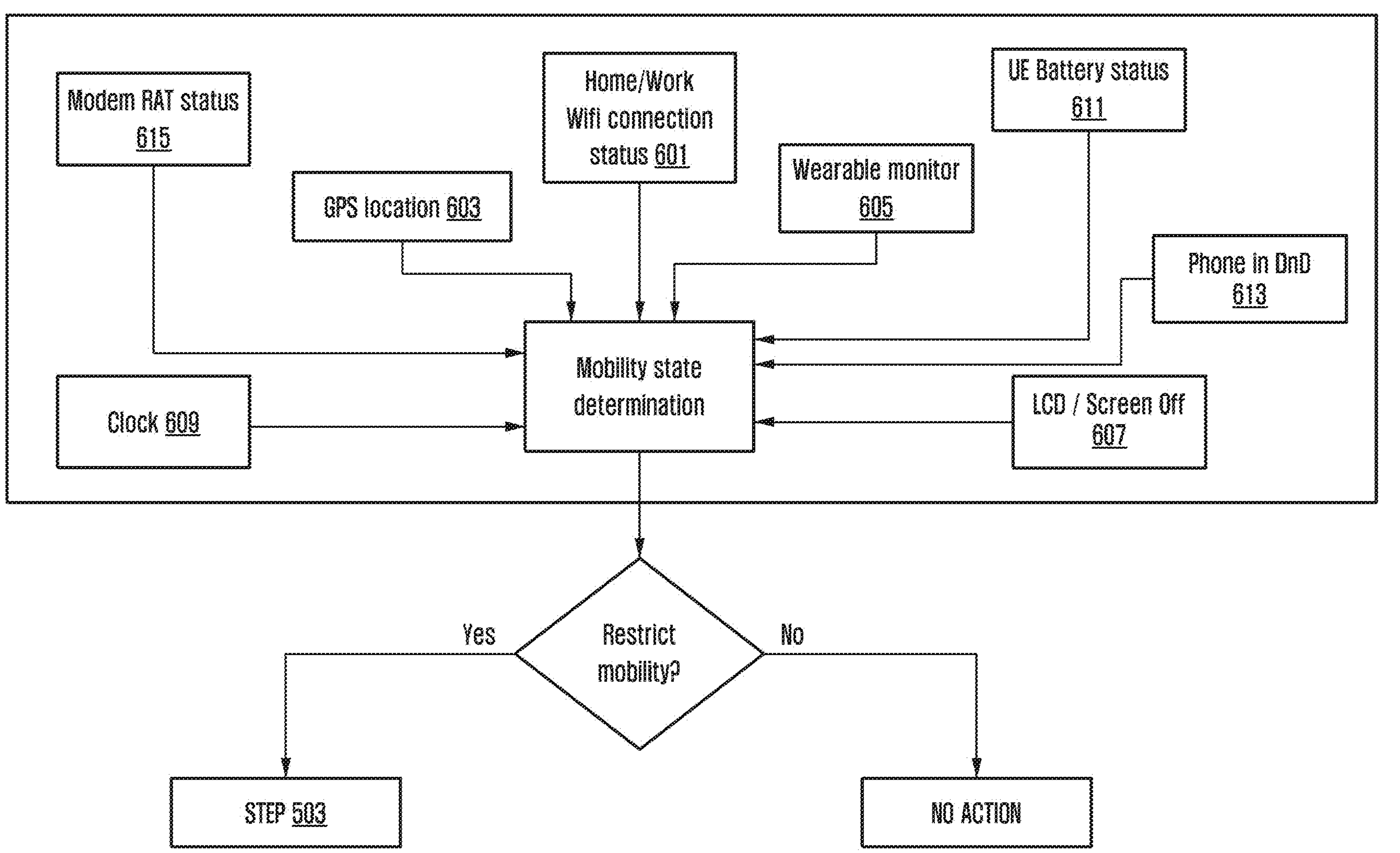
FIG. 6 illustrates a plurality of predefined conditions to determine mobility state of the UE, according to an embodiment of the disclosure.

FIG. 6 illustrates a plurality of predefined conditions to determine mobility state of the UE, according to an embodiment of the disclosure.

Referring to FIG. 6, plurality of predefined conditions may include a connectivity status 601 of the UE 400, a location status 603 of the UE 400, a status of one or more external devices 605, such as wearable devices connected to the UE 400, a status of display 607 of the UE 400, a time 609 of determining the state of the UE 400, a status of a user, a status of a battery 611 of the UE 400, a status of do not disturb (DnD) feature 613 of the UE 400, and a status of modem radio access technology (RAT) 615 connected to the UE 400 and a user profile. For example, if the display of the UE 400 is OFF for a prolonged period of time, then it may be determined that the UE 400 is static. The prolonged period of time may be configured by the user/UE. Similarly, if the status of DnD feature is ON, then it may be determined that the UE 400 is static. It should be noted that the plurality of predefined conditions may be configurable and may be configured by the user/UE 400. Further, as shown in FIG. 6, if the mobility state of the UE 400 is static, i.e., the mobility of the UE 400 shall be restricted, then the method 500 moves to operation 503. Otherwise, the UE 400 does not take any further action. It should be noted that FIG. 6 depicts a few examples of the plurality of predefined conditions and any other features related to the UE will fall within the scope of the plurality of predefined conditions.

Moving to operation 503, the method 500 includes determining a list of priority cells among a plurality of available cells. Each of the priority cells in the list of priority cells is associated with a priority value based on a plurality of predefined priority conditions. In an embodiment, the plurality of predefined priority conditions have been illustrated in FIG. 7.

FIG. 7 illustrates a plurality of predefined priority conditions to determine a list of priority cells, according to an embodiment of the disclosure.

Referring to FIG. 7, the plurality of predefined priority conditions may include priority based on an absolute signal-to-noise ratio (SNR), a network-configured priority for cells of the same RAT, RAT-based priority, coverage-based priority, bandwidth-based priority, and priority based on handover from the network 410, as shown in FIG. 7. Referring to FIG. 7, each of the plurality of predefined priority conditions has an associated priority value. For example, let us assume that four cells, i.e., N41 PCI2, N41 PCI3, N74 PCI1, and N66 PCI4 are available to be connected with the UE. Accordingly, based on the SNR, N41 PCI2 has the highest priority, i.e., priority 1 followed by N41 PCI3, N74 PCI1, and N66 PCI4. Similarly, in the case of the network-configured priority for cells of the same RAT, N41 PCI2 has the highest priority, i.e., priority 1 followed by N66 PCI4, N74 PCI1, and N41 PCI3. In such embodiment, the network 410 may assign priority levels to the cells based on SIB2, SIB3, associated with the cells. Similarly, in the case of the RAT-based priority, as 5G RAT has the highest priority, hence all NR cells, i.e., N41 PCI2, N41 PCI3, N74 PCI1, and N66 PCI2 have the highest priority and LTE B2 cell has the lowest priority. In the case of coverage-based priority. Frequency-division duplexing (FDD) cells operate on low frequency and have higher coverage. Accordingly, the N71 cell has the highest coverage, followed by N66 and N41. In the case of bandwidth-based priority, as N41 PCI2 has the highest bandwidth (BW), N41 PCI 2 is provided the highest priority level 1 followed by N41 PCI3, N74 PCI1, and N66 PCI4. In the case of priority based on handover from the network 410, the network 410 may associate the priority level with each cell. As shown in FIG. 7, the processor 404 receives the list of cells along with the plurality of predefined priority conditions and corresponding priority levels. In an embodiment, as shown in FIG. 7, the processor 404 may also receive MeasObject with infinite report quantity, i.e., how many times the UE 400 shall perform measurement and trigger measurement report for a corresponding cell. Upon receiving all the information, the processor 404 may determine the list of priority cells, as shown in FIG. 7.

Accordingly, the UE 400 may determine the priority list based on the predefined priority conditions related to the cells received from the network 410.

Referring back to FIG. 5, at operation 505, the method 500 includes switching the UE 400 to a restricted mobility mode based on the determined mobility state and the priority value associated with each priority cell in the list of priority cells. In particular, if the mobility state of the UE 400 is static, then the UE 400 is switched to the restricted mobility mode based on the priority value associated with each priority cell in the list of priority cells. In an embodiment, the restricted mobility mode refers to a mode where certain functions of the UE are restricted for a predetermined time period, as explained further in detail. In an embodiment, the restricted mobility mode may include a first sub-mode and a second sub-mode. Accordingly, the UE 400 may be switched either to a first sub-mode or a second sub-mode in the restricted mobility mode. In an embodiment, the UE 400 is connected in the first sub-mode if the UE 400 is in an idle state. In the first sub-mode, the UE 400 refrains from transmitting an MR and performing cell reselection for a predetermined time period. In particular, the UE 400 does not perform measurement for any of the cells from the list of priority cells and does not perform reselection for the predetermined time period. In an embodiment, the predetermined time period may be configurable and may be configured by the UE 400. In the first sub-mode, the UE 400 is connecting, for the predetermined time period, to a priority cell having the highest priority value among the priority cells in the list, for example, cell N41 PCI 2 as shown in FIG. 7. Further, the UE 400 restricts transmission of the MR and cell reselection until the predetermined time period is expired, or a signal strength of the priority cell is below a predetermined threshold. For example, if the signal strength of cell N41 PCI 2 is below the predetermined threshold, then the UE 400 may perform measurement for other cells available in the list of priority cells and may reselect to one of the other cells available in the list of priority cells. In an embodiment, the predetermined time period may be configurable and may be configured by the network 410. Further, in the first sub-mode, the UE 400 re-determines the mobility state of the UE 400 based on the at least one of the plurality of predefined conditions after the predetermined time period is expired, or the signal strength of the priority cell is below a predetermined threshold. It should be noted that the UE 400 may redetermine the mobility state in accordance with techniques discussed in reference to operation 501.

Further, the UE 400 is connected in the second sub-mode if the UE 400 is in a connected state. In the second sub-mode, the UE 400 transmits the MR for a predefined number of times, if the UE 400 is configured with infinite MR configuration. The infinite MR configuration corresponds to a number of MR transmitted by the UE 400 until the UE 400 receives a response to the MR from the network 410. In an embodiment, the predetermined time period may be configurable and may be configured by the network 410. In the second sub-mode, the UE 400 determines a priority cell having the highest priority value among the priority cells in the list, for example, cell N41 PCI 2 as shown in FIG. 7. Further, the UE 400 transmits one or more measurement reports (MR) related to the priority cell to the network 410 for the predetermined number of times. After the expiration of the predetermined number of times, the UE 400 connects to the priority cell having the highest priority value, i.e., cell N41 PCI 2, for the predetermined time period, upon receiving a handover request from the network 410. However, if the handover request is not received from the network 410, then the UE 400 connects in the first sub-mode upon moving to idle mode voluntarily or involuntarily based on mobility from NW. Further, in the second sub-mode, the UE 400 re-determines the mobility state of the UE based on the at least one of the plurality of predefined conditions after the predetermined time period is expired, or the signal strength of the priority cell is below the predetermined threshold. It should be noted that the UE 400 may redetermine the mobility state in accordance with techniques discussed in reference to operation 501.

In a further embodiment, the method (500) may be performed using a machine learning (ML) model. Accordingly, the system 402 may include the ML model.

Accordingly, the disclosure provides techniques to reduce battery consumption on a static UE 400 with minimal usage where mobility is restricted by identifying a few events, such as the mobility state of the UE 400, that happen on the UE 400 and based on which the UE 400 triggers itself into the restrict mobility mode. The disclosure also provides techniques for the UE 400 to identify a cell for latching on to during the period when mobility is restricted. The disclosure also provides techniques to re-assess the status of the serving condition once every time a timer monitoring the events, i.e., predetermined time period, is expired. Accordingly, the disclosure reduces measurements and reporting provided thereby reducing overall power consumption on the UE 400, when the UE 400 is static and not using primary services such as call/data/Short Message Service (SMS), etc. Hence, the disclosure provides the users with better device performance, thereby saving power and increasing battery life. The disclosure also saves network resources by reducing signalling that is caused due to unnecessary and continuous mobility between two cells or two RATs.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for power management performed by a user equipment (UE) connected to a network, the method comprising:

determining, by the UE, a mobility state of the UE based on satisfaction of at least one of a plurality of predefined conditions;

determining, by the UE, a list of priority cells among a plurality of available cells, wherein each priority cell in the list of priority cells is associated with a priority value based on a plurality of predefined priority conditions; and switching, by the UE, the UE to a restricted mobility mode based on the determined mobility state and the priority value associated with each priority cell in the list of priority cells, wherein switching the UE to the restricted mobility mode comprises connecting the UE in a first sub-mode, wherein the UE, in the first sub-mode, refrains from transmitting a measurement report (MR) and performing cell reselection, for a predetermined time period, when the UE is in an idle state.

2. The method of claim 1, wherein the connecting of the UE in the first sub-mode comprises:

connecting, for the predetermined time period, the UE to a priority cell having a highest priority value among the priority cells in the list;

restricting transmission of the MR and cell reselection until one of:

the predetermined time period is expired, or a signal strength of the priority cell is below a predetermined threshold; and re-determining the mobility state of the UE based on the at least one of the plurality of predefined conditions after one of:

the predetermined time period is expired, or the signal strength of the priority cell is below the predetermined threshold.

3. The method of claim 1, wherein switching the UE to the restricted mobility mode comprises connecting the UE in one of the first sub-mode or a second sub-mode, wherein the UE, in the second sub-mode, transmits the MR for a predefined number of times, when the UE is in a connected state and when the UE is configured with infinite MR configuration, wherein the infinite MR configuration corresponds to a number of MR transmitted by the UE until the UE receives a response to the MR from the network, and wherein the connecting of the UE in the second sub-mode comprises:

determining a priority cell having a highest priority value among the priority cells in the list;

transmitting one or more MRs related to the priority cell to the network for the predefined number of times; and upon expiration of the predefined number of times, performing one of:

connecting to the priority cell having the highest priority value for the predetermined time period, when a handover request is received from the network; or connecting in the first sub-mode upon moving to the idle state, when the handover request is not received from the network.

4. The method of claim 3, comprising:

re-determining the mobility state of the UE based on the at least one of a plurality of predefined conditions after one of:

the predetermined time period is expired, or a signal strength of the priority cell is below a predetermined threshold.

5. The method of claim 1, wherein the plurality of predefined conditions is related to an interaction of the UE with a user and one or more external devices.

6. The method of claim 1, wherein the plurality of predefined conditions include a connectivity status of the UE, a location status of the UE, a status of one or more external devices connected to the UE, a status of display of the UE, a time of determining the state of the UE, a status of a user, a status of a battery of the UE, a status of do not disturb (DnD) feature of the UE, and a status of modem radio access technology (RAT) connected to the UE and a user profile.

7. The method of claim 1, wherein the plurality of predefined priority conditions include priority based on an absolute signal-to-noise ratio (SNR), a network-configured priority for cells of a same radio access technology (RAT), a RAT-based priority, a coverage-based priority, a bandwidth-based priority, and a priority based on a handover from the network.

8. The method of claim 1, wherein the method is performed using a machine learning (ML) model.

9. A user equipment (UE) connected to a network, the UE comprising:

memory storing one or more computer programs; and one or more processors communicatively coupled to the memory, wherein the one or more computer programs include computer-executable instructions that, when executed by the one or more processors individually or collectively, cause the UE to:

determine a mobility state of the UE based on satisfaction of at least one of a plurality of predefined conditions, determine a list of priority cells among a plurality of available cells, wherein each priority cell in the list of priority cells is associated with a priority value based on a plurality of predefined priority conditions, and switch the UE to a restricted mobility mode based on the determined mobility state and the priority value associated with each priority cell in the list of priority cells, wherein the UE is configured to switch to the restricted mobility mode by connecting the UE in a first sub-mode, wherein the UE, in the first sub-mode, refrains from transmitting a measurement report (MR) and performing cell reselection, for a predetermined time period, when the UE is in an idle state.

10. The UE of claim 9, wherein, to connect in the first sub-mode, the one or more computer programs further include computer-executable instructions that, when executed by the one or more processors individually or collectively, cause the UE to:

connect, for the predetermined time period, the UE to a priority cell having a highest priority value among the priority cells in the list, restrict transmission of the MR and cell reselection until one of:

the predetermined time period is expired, or a signal strength of the priority cell is below a predetermined threshold, and re-determine the mobility state of the UE based on the at least one of the plurality of predefined conditions after one of:

the predetermined time period is expired, or the signal strength of the priority cell is below the predetermined threshold.

11. The UE of claim 9, wherein switching the UE to the restricted mobility mode comprises connecting the UE in one of the first sub-mode or a second sub-mode, wherein the UE, in the second sub-mode, transmits the MR for a predefined number of times, when the UE is in a connected state and when the UE is configured with infinite MR configuration, wherein the infinite MR configuration corresponds to a number of MR transmitted by the UE until the UE receives a response to the MR from the network, and wherein, to connect in the second sub-mode, the one or more computer programs further include computer-executable instructions that, when executed by the one or more processors individually or collectively, cause the UE to:

determine a priority cell having a highest priority value among the priority cells in the list, transmit one or more MRs related to the priority cell to the network for the predefined number of times, and upon expiration of the predefined number of times, perform one of:

connect to the priority cell having the highest priority value for the predetermined time period, when a handover request is received from the network, or connect in the first sub-mode upon moving to the idle state, when the handover request is not received from the network.

12. The UE of claim 11, wherein, the one or more computer programs further include computer-executable instructions that, when executed by the one or more processors individually or collectively, cause the UE to:

re-determine the mobility state of the UE based on the at least one of a plurality of predefined conditions after one of:

the predetermined time period is expired, or a signal strength of the priority cell is below a predetermined threshold.

13. The UE of claim 9, wherein the plurality of predefined conditions is related to an interaction of the UE with a user and one or more external devices.

14. The UE of claim 9, wherein the plurality of predefined conditions include a connectivity status of the UE, a location status of the UE, a status of one or more external devices connected to the UE, a status of display of the UE, a time of determining the state of the UE, a status of a user, a status of a battery of the UE, a status of do not disturb (DnD) feature of the UE, and a status of modem radio access technology (RAT) connected to the UE and a user profile.

15. The UE of claim 9, wherein the plurality of predefined priority conditions include priority based on an absolute signal-to-noise ratio (SNR), a network configured priority for cells of a same radio access technology (RAT), a RAT-based priority, a coverage-based priority, a bandwidth-based priority, and a priority based on handover from the network.

16. The UE of claim 9, wherein the one or more computer programs include computer-executable instructions for implementing a machine learning (ML) model.

17. One or more non-transitory computer-readable storage media storing one or more computer programs including computer-executable instructions that, when executed by one or more processors of a user equipment (UE) individually or collectively, cause the UE to perform operations, the operations comprising:

determining, by the UE, a mobility state of the UE based on satisfaction of at least one of a plurality of predefined conditions;

determining, by the UE, a list of priority cells among a plurality of available cells, wherein each priority cell in the list of priority cells is associated with a priority value based on a plurality of predefined priority conditions; and switching, by the UE, the UE to a restricted mobility mode based on the determined mobility state and the priority value associated with each priority cell in the list of priority cells, wherein switching the UE to the restricted mobility mode comprises connecting the UE in one of:

a first sub-mode, wherein the UE refrains from transmitting a measurement report (MR) and performing cell reselection, for a predetermined time period, when the UE is in an idle state, or a second sub-mode, wherein the UE transmits the MR for a predefined number of times, when the UE is in a connected state and when the UE is configured with infinite MR configuration, wherein the infinite MR configuration corresponds to a number of MR transmitted by the UE until the UE receives a response to the MR from a network.

18. The one or more non-transitory computer-readable storage media of claim 17, wherein the connecting of the UE in the first sub-mode comprises:

connecting, for the predetermined time period, the UE to a priority cell having a highest priority value among the priority cells in the list;

restricting transmission of the MR and cell reselection until one of:

the predetermined time period is expired, or a signal strength of the priority cell is below a predetermined threshold; and re-determining the mobility state of the UE based on the at least one of the plurality of predefined conditions after one of:

the predetermined time period is expired, or the signal strength of the priority cell is below the predetermined threshold.

19. The one or more non-transitory computer-readable storage media of claim 17, wherein switching the UE to the restricted mobility mode comprises connecting the UE in one of the first sub-mode or a second sub-mode, wherein the UE, in the second sub-mode, transmits the MR for a predefined number of times, when the UE is in a connected state and when the UE is configured with infinite MR configuration, wherein the infinite MR configuration corresponds to a number of MR transmitted by the UE until the UE receives a response to the MR from the network, and wherein the connecting of the UE in the second sub-mode comprises:

determining a priority cell having a highest priority value among the priority cells in the list;

transmitting one or more MRs related to the priority cell to the network for the predefined number of times; and upon expiration of the predefined number of times, performing one of:

connecting to the priority cell having the highest priority value for the predetermined time period, when a handover request is received from the network; or connecting in the first sub-mode upon moving to the idle state, when the handover request is not received from the network.

* * * * *